No. 675,618. Patented June 4, 1901.
G. E. BARTHOLOMEW.
ROLLER BEARING.
(Application filed Dec. 24, 1900.)
(No Model.)
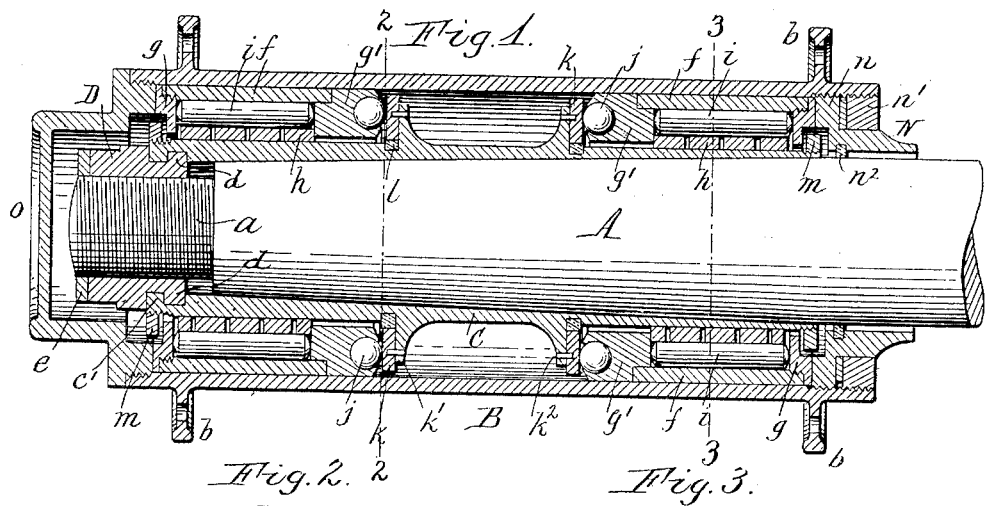
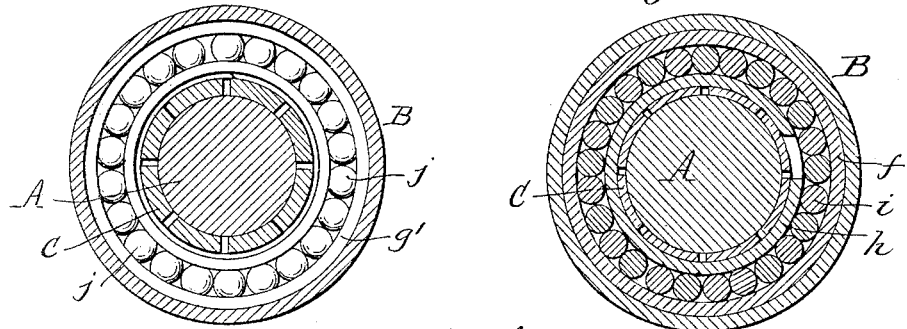
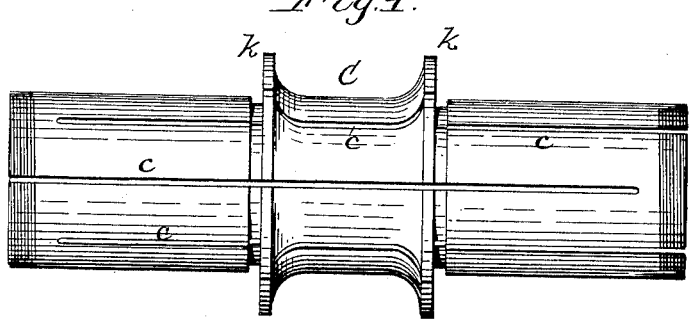
Witnesses:
E. A. Volk
F. F. Scherzinger
George E. Bartholomew Inventor.
By Wilhelm Bonner Attorneys.

UNITED STATES PATENT OFFICE.

GEORGE E. BARTHOLOMEW, OF BUFFALO, NEW YORK, ASSIGNOR OF ONE-HALF TO ALBERT A. ENGLE, OF SAME PLACE.

ROLLER-BEARING.

SPECIFICATION forming part of Letters Patent No. 675,618, dated June 4, 1901.

Application filed December 24, 1900. Serial No. 40,927. (No model.)

*To all whom it may concern:*

Be it known that I, GEORGE E. BARTHOLOMEW, a citizen of the United States, residing at Buffalo, in the county of Erie and State of New York, have invented new and useful Improvements in Roller-Bearings, of which the following is a specification.

This invention relates to a roller-bearing designed more especially for the hubs of comparatively large wheels, such as the wheels of automobiles; but the same is also applicable to the wheels of other vehicles.

The object of my invention is the construction of a simple, durable, and inexpensive roller-bearing which can be conveniently adjusted to compensate for wear.

In the accompanying drawings, Figure 1 is a sectional elevation of a wheel-hub provided with my improved bearing. Figs. 2 and 3 are cross-sections in lines 2 2 and 3 3, Fig. 1. Fig. 4 is a detached side elevation of the expansible sleeve. Fig. 5 is a similar view of one of the coiled bearing-rings. Fig. 6 is a similar view of one of the screw-nuts applied to the end of the expansible sleeve. Fig. 7 is a side elevation of a modified construction of the coiled bearing-rings.

Like letters of reference refer to like parts in the several figures.

A is a shaft or axle spindle which is tapered toward its outer end and terminates in a reduced screw-stem $a$.

B is a wheel-hub or similar casing which surrounds the axle-spindle and which has the usual perforated flanges $b$ or other means for the attachment of the spokes.

C is an expansible sleeve surrounding the axle-spindle and having its bore tapered to fit the taper of the spindle, so that upon forcing the sleeve inwardly on the tapering spindle the same is expanded. In the preferred construction shown in the drawings this sleeve is split by longitudinal slits $c$, extending nearly from end to end thereof, the slits preferably extending alternately from opposite ends of the sleeve, as shown in Fig. 4. The sleeve is adjusted lengthwise of the spindle by an adjusting-nut D, applied to the screw-stem $a$ of the spindle and engaging with the outer end of the sleeve by a union or rotary joint, consisting, preferably, of interlocking annular flanges $c'$ and $d$, formed on the sleeve and its adjusting-nut, respectively. This adjusting-nut is engaged with the adjacent end of the sleeve before the latter is applied to the spindle by spreading the sleeve with a suitable mandrel, inserting the flanged end of the nut in the sleeve, and then withdrawing the mandrel to permit the sleeve to again contract.

$e$ is a lock-nut applied to the end of the screw-stem $a$ and bearing against the adjusting-nut D.

$f$ represents annular bearing cases or bushings fitted snugly in the end portions of the wheel-hub B and each provided at its inner and outer ends with rings or collars $g\ g'$, which extend inwardly beyond the inner surfaces of said cases, so as to form annular raceways with the same. The inner collars $g'$ may be rabbeted to receive the adjacent ends of the cases $f$, while the outer collars $g$ engage with the cases by a screw-thread, as shown in Fig. 1.

$h$ represents expansible bearing rings or sleeves which surround the expansible taper sleeve C opposite the bearing-cases $f$ and which preferably consist of a coil or series of convolutions formed by splitting a sleeve spirally, as shown in Fig. 5. If desired, these bearing-sleeves may consist of a number of separate rings $h'$, each of which is split or divided obliquely, as shown in Fig. 7.

$i$ represents cylindrical rollers interposed between the bearing-cases $f$ and the expansible bearing-rings $h$ and confined endwise between the end collars $g\ g'$ of each bearing. The inner collar $g'$ of each bearing is provided in its inner face with an annular groove or race containing a row of balls $j$, which receive the end thrust of the bearing. The balls $j$ run against vertical bearing rings or washers $k$, which surround the expansible sleeve C and abut against annular flanges or shoulders $k'$, arranged on the central portion of said sleeve. These vertical bearing-rings are preferably continuous and may be pinned to the sleeve C, as shown at $k^2$. In order to permit the sleeve C to expand, the washers $k$ are fitted loosely thereon and centered by washers $l$ of felt or similar yielding material interposed between the same and the sleeve and confined in annular grooves formed in the sleeve, as shown.

$m$ represents stop-nuts applied to the screw-threaded end portions of the sleeve C on the outer side of the adjacent collars $g$. These nuts serve to retain the bearing-cases in place on the sleeve in assembling the sleeve and the wheel-hub and in removing the sleeve from the hub. The nuts $m$ are split, as seen in Fig. 6, to permit the sleeve C to expand.

N is a dust-cap closing the inner end of the wheel-hub and having a flange $n$, which is screwed into the hub, and $n'$ is a lock-nut for said dust-cap.

$n^2$ is a dust-excluding washer of felt or other suitable material interposed between the dust-cap N and the axle-spindle A and seated in an annular groove formed in the bore of the cap, as shown in Fig. 1.

$o$ is a suitable dust-cap which closes the outer end of the wheel-hub and which is preferably screwed into the hub, as shown in Fig. 1.

In the use of the bearing the sleeve C, the expansible bearing-rings $h$, and the vertical bearing-rings $k$ remain stationary, while the outer bearing-cases $f$ and their end collars $g$ $g'$ turn with the wheel-hub.

In order to take up looseness or wear of the rollers $i$ or their bearing-surfaces, the lock-nut $e$ is loosened and the adjusting-nut D is turned in the proper direction to force the split sleeve C farther inwardly on the axle-spindle. This causes said sleeve to expand, and the latter in turn expands the inner bearing-rings $h$, thereby moving the rollers outwardly against the surrounding bearing-cases $f$ and simultaneously adjusting the bearings at both ends of the hub by manipulating a single adjusting member. After effecting the desired adjustment the lock-nut $e$ is again tightened. Any lateral wear or looseness of the bearings is readily taken up by screwing the inner dust-cap N farther inwardly in the wheel-hub, so as to bring the balls $j$ in contact with the vertical bearing-rings $k$.

My improved bearing comprises a comparatively small number of parts and can be manufactured at a correspondingly small cost. The rollers have a continuous bearing-surface which causes the same to run smoothly, and as they have no direct contact with the axle-spindle the latter receives no wear and the rollers run in a larger circle, permitting the use of a larger number of rollers and rendering the bearing more durable. The bearing is also compact and permits a light and neat construction of the wheel-hub.

I claim as my invention—

1. The combination with a tapering shaft or spindle, and a casing surrounding the same, of an expansible sleeve having a tapering bore which fits said spindle, an adjusting device for shifting said sleeve lengthwise on said spindle, and rollers interposed between said sleeve and the surrounding casing, substantially as set forth.

2. The combination with a tapering shaft or spindle, and a casing surrounding the same, of an expansible sleeve having a tapering bore which fits said spindle, an adjusting device for shifting said sleeve lengthwise on said spindle, an expansible bearing-ring surrounding said sleeve, and rollers interposed between said expansible bearing-ring and the surrounding casing, substantially as set forth.

3. The combination with a tapering shaft or spindle provided at its outer end with a screw-stem, of a casing surrounding the spindle, a split sleeve having a tapering bore which fits said spindle, an adjusting-nut applied to the screw-stem of the spindle and connected with said sleeve by a union or rotary joint, and rollers interposed between said sleeve and the surrounding casing, substantially as set forth.

4. The combination with a tapering spindle provided at its outer end with a screw-thread, of a surrounding casing, a bearing case or bushing arranged in the end of the casing, collars or flanges arranged at opposite ends of said bushing and extending inwardly beyond the inner surface thereof, an expansible sleeve having a tapering bore which fits said spindle, a screw-nut engaging with the screw-thread of the spindle and connected with said sleeve by a union-joint, a split bearing-ring surrounding said sleeve opposite said bushing, and rollers interposed between said bushing and said split bearing-ring, substantially as set forth.

5. The combination with a tapering spindle and a casing surrounding the same, of an expansible internally-tapered sleeve surrounding said spindle and provided with an external flange or shoulder, a bearing case or bushing seated in the end of said casing, collars arranged at opposite ends of said bushing and extending inwardly beyond the inner surface thereof, balls interposed between the flange of said sleeve and the collar at the inner end of said bushing, and rollers interposed between said bushing and said sleeve, substantially as set forth.

6. The combination with a tapering spindle and a casing surrounding the same, of an expansible internally-tapering sleeve surrounding said spindle and provided on its central portion with external annular flanges or shoulders, vertical bearing-rings abutting against the outer faces of said flanges, bearing cases or bushings seated in the ends of said casing, collars arranged at opposite ends of said bushings and extending inwardly beyond the inner surface thereof, the collar at the inner end of each bushing being provided in its inner face with a ball-race, balls arranged in said races and running against said vertical bearing-rings, split bearing-rings applied to said expansible sleeve opposite said bearing-bushings, rollers interposed between said split rings and said bushings, and caps applied to the ends of the casing and bearing against the collars at the outer ends of said bushings, substantially as set forth.

Witness my hand this 20th day of December, 1900.

GEORGE E. BARTHOLOMEW.

Witnesses:
ALBERT A. ENGLE,
CARL F. GEYER.